Aug. 5, 1941.                 A. G. SNELL                    2,251,858
                         MOLD FOR PLASTIC MATERIAL
                           Filed March 12, 1938

Fig.3.                                              Fig.4.

INVENTOR
Alfred George Snell
BY
Morrison, Kennedy & Campbell
ATTORNEYS

Patented Aug. 5, 1941

2,251,858

UNITED STATES PATENT OFFICE 2,251,858

MOLD FOR PLASTIC MATERIAL

Alfred George Snell, Sutton Coldfield, England, assignor to Ashdowns Limited, Liverpool, England Application March 12, 1938, Serial No. 195,544
In Great Britain March 16, 1937

3 Claims. (Cl. 18—42)

This invention relates to a mold for plastic material, adapted to mold annular articles. An example of such articles is a frame for insertion into a window opening in an automobile body.

It is applicable to plastic materials such as that known under the registered trade-mark "Bakelite," which shrink on opening the mold.

In molding for instance, a frame from "Bakelite," the molded frame, when the mold is opened, shrinks and, consequently, binds on the inner wall of the mold. The removal of the frame from the mold therefore requires considerable force, and it has hitherto been customary to provide in the bottom (or molding retaining) part of the mold slidable pins or the like which can be pressed from outside the mold against the molding to force it out of the mold.

These pins are objectionable for several reasons. First, they increase the cost of the mold. Secondly, they leave marks on the molded surface, even when their ends are accurately on a level with the inner surface of the mold. Thirdly, great care has to be exercised to ensure that their ends are accurately on a level with the inner surface of the mold, so as to avoid the formation of depressions or protuberances in the molding. Fourthly, their operation occupies time and diminishes the rate at which moldings can be made.

By means of the invention, the use of these pins or the like can be avoided.

In this specification, the portion of the mold which retains the molded article will be termed the "mold bottom" and the other portion will be termed the "plunger."

According to the invention, the inner wall of the article is formed by a plunger, and the part of the plunger within the space enclosed by the article comes into contact with the mold bottom, so that every forming portion of the mold bottom surface which faces inwardly has a free space into which the article can shrink on withdrawal of the plunger, and every forming portion of the mold bottom which faces outwardly away from the article is inclined upwardly towards the plunger and inwardly towards the centre of the article.

Figure 1:
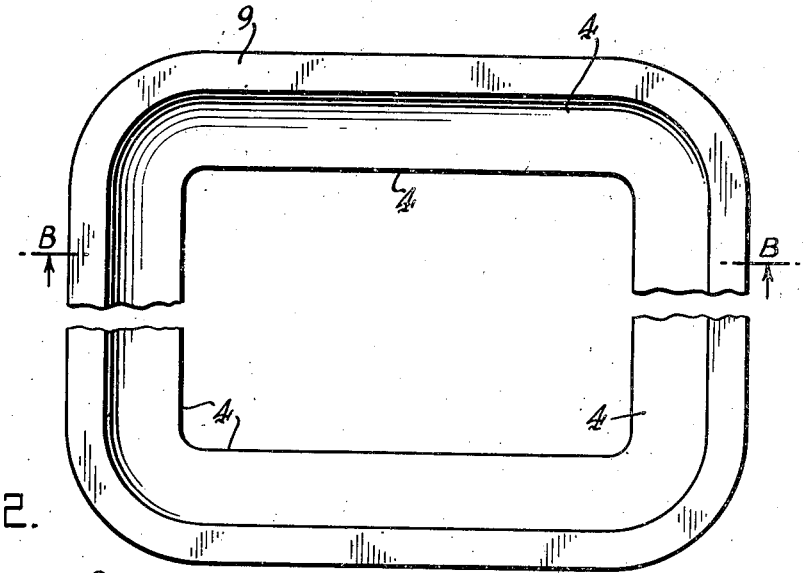
Figure 2:
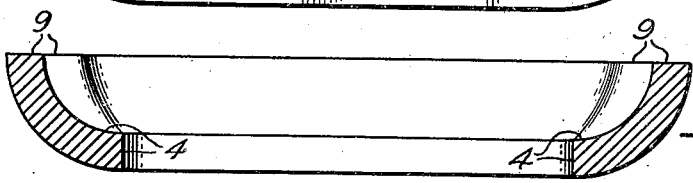
Figure 2:
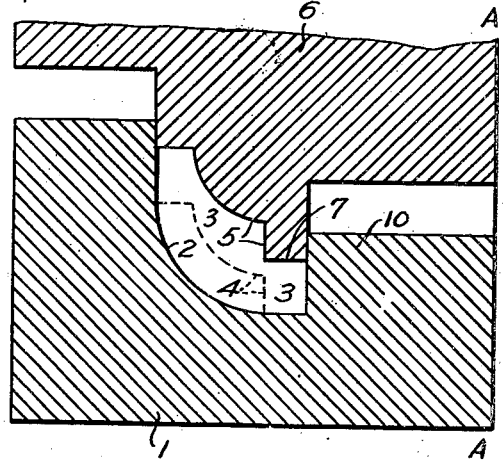
Figure 2:
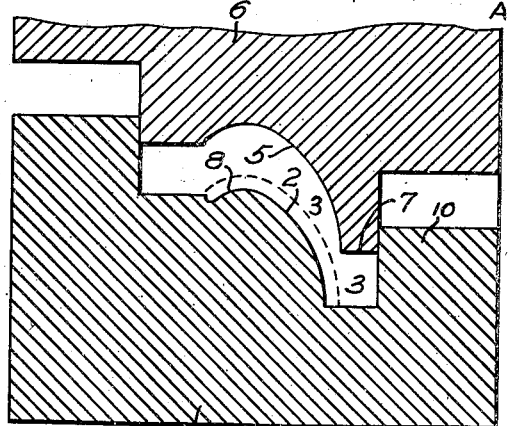

In the accompanying drawing: Figure 1 is a part plan view of an annular article to which the invention is applicable and Figure 2 is a section on the line B—B of Figure 1. Figure 3 is a half section of a mold adapted to mold the article of Figure 1, and Figure 4 is a half section of a mold for an article of different form, the lines A—A being the centre lines of the molds, and the articles to be molded being shown in section by dotted lines.

Referring to Figures 1 and 2, the annular article consists of the peripheral part 9, having internal walls 4. In Figure 3, the mold bottom 1 has the forming surface 2 and a portion 10 extending upwards within the article and a free space 3 within the forming surface and outside the portion 10. The inner wall 4 of the article is formed by the surface 5 of the plunger 6 which is shown partially withdrawn. The part 7 of the plunger which enters the space enclosed by the article enters the free space 3 and comes into contact with the mold bottom at the bottom of this free space. In operation the molding powder is filled into the hollow in the mold bottom between the forming surface 2 and the portion 10, and the plunger presses the material out of the said hollow to form the article. On withdrawal of the plunger, the article is able to shrink freely and therefore becomes loose in the mold and can be lifted out.

Referring to Figure 4, the forming portion of the mold surface has an inwardly facing portion 2 and an outwardly facing portion 8. The inwardly facing portion 2 has adjacent to it the free space 3 into which the article can shrink on withdrawal of the plunger, as in the mold of Figure 3, the inner wall of the article being formed by the surface 5 of the plunger, while the part 7 of the plunger is adapted to come into contact with the mold bottom at the bottom of the free space 3. The outwardly facing portion 8 is inclined upwardly and inwardly, so that, on the article shrinking, there is an upward component in the force of contraction which tends to lift the article from the mold bottom.

Having described my invention, I declare that what I claim and desire to secure by Letters Patent is:

1. For molding an article of plastic material and of frame-like shape, a mold comprising one mold section wherein the article is retained after molding, said mold section being provided with a channel having outer and inner wall surfaces, and a second mold section cooperating with the outer wall surface of the channel to form therewith a molding space of proper contour for the article, said second mold section being provided with a portion arranged to enter the channel adjacent the inner wall surface thereof and during the molding operation to space apart the article along its inner edge from said inner wall surface, said portion being withdrawable from the channel after the molding operation without removing the article therefrom whereby to afford space for shrinkage in the article.

2. For molding an article of plastic material and of frame-like shape, a mold comprising one mold section wherein the article is retained after molding, said mold section being provided with a channel having outer and inner wall surfaces and a bottom surface, and a second mold section cooperating with a portion of the channel surface to provide therewith a molding space of proper contour for said article, said second mold section being provided with a portion arranged to enter the channel adjacent the inner wall surface thereof and come substantially into contact with a portion of the bottom surface thereof and during the molding operation to space apart the article along its inner edge from said inner wall surface, said portion being withdrawable from the channel after the molding operation without removing the article therefrom whereby to afford space for shrinkage in the article.

3. For molding an article of plastic material and of frame-like shape from a molding powder, a mold comprising one mold section wherein the article is retained after molding, said mold section being provided with a channel defined throughout its entire length by outer and inner wall surfaces and a bottom surface so as to retain the powder therein, and a second mold section cooperating with the outer wall surface of the channel to form therewith a molding space of proper contour for the article, said second mold section being provided with a portion arranged to enter the channel adjacent the inner wall surface thereof and during the molding operation to space apart the article along its inner edge from said inner wall surface, said portion being withdrawable from the channel after the molding operation without removing the article therefrom whereby to afford space for shrinkage in the article.

ALFRED GEORGE SNELL.